No. 616,212.  W. R. THORNTON.  Patented Dec. 20, 1898.
HEAD GATE.
(Application filed June 24, 1898.)
(No Model.) 2 Sheets—Sheet 1.
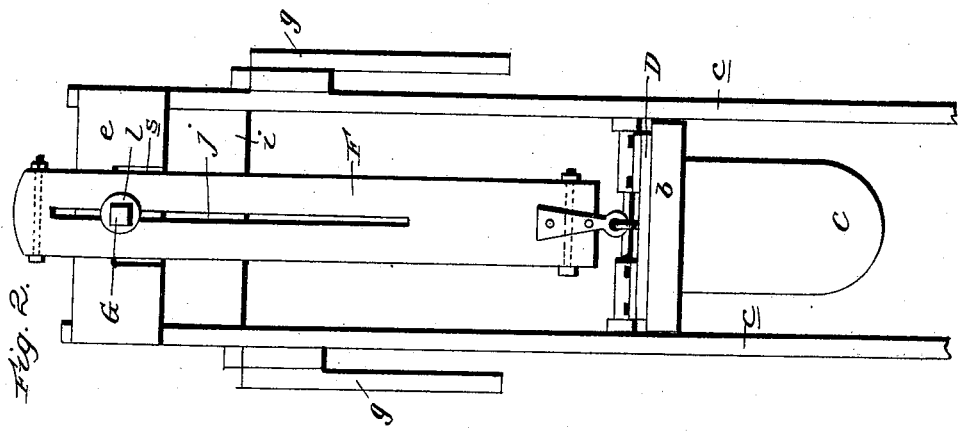
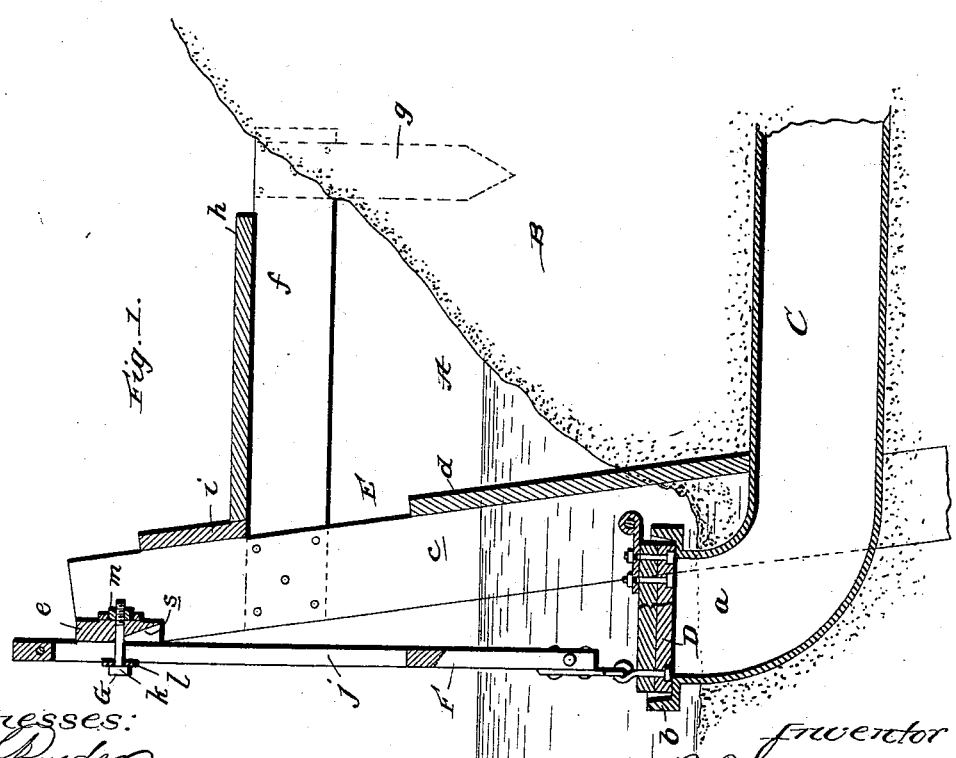

No. 616,212. Patented Dec. 20, 1898.
W. R. THORNTON.
HEAD GATE.
(Application filed June 24, 1898.)
(No Model.) 2 Sheets—Sheet 2.
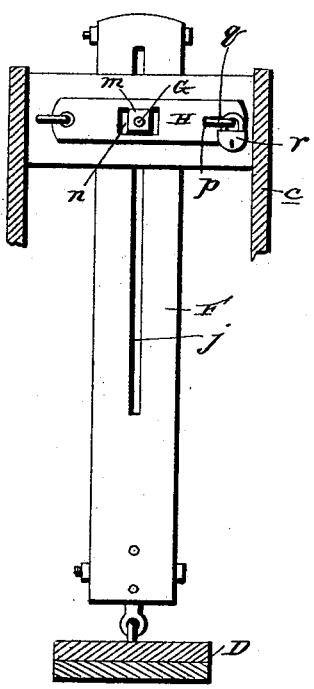
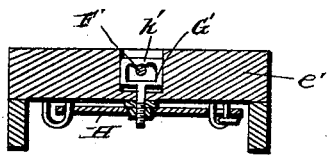
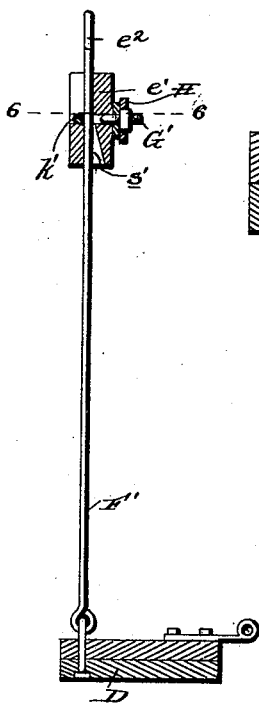
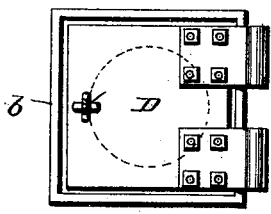

UNITED STATES PATENT OFFICE.

WILBER R. THORNTON, OF BERTHOUD, COLORADO.

HEAD-GATE.

SPECIFICATION forming part of Letters Patent No. 616,212, dated December 20, 1898.

Application filed June 24, 1898. Serial No. 684,361. (No model.)

*To all whom it may concern:*

Be it known that I, WILBER R. THORNTON, a citizen of the United States, residing at Berthoud, in the county of Larimer and State of Colorado, have invented new and useful Improvements in Head-Gates, of which the following is a specification.

My invention relates to head-gates such as are employed in irrigating systems to control the passage of water from ditches or laterals to contiguous lands and will be fully understood from the following description and claims when taken in conjunction with the annexed drawings, in which—

Figure 1 is a sectional view illustrating my improved head-gate in operation. Fig. 2 is a front elevation of the same. Fig. 3 is a section taken in rear of the valve-stem. Fig. 4 is a horizontal section taken in the plane slightly above the valve or gate proper. Fig. 5 is a vertical section of a modification. Fig. 6 is a section taken in the plane indicated by line 6 6 of Fig. 5.

Referring by letter to the said drawings, and more particularly to Figs. 1 to 4 thereof, A is a ditch or lateral. B is a bank at one side of the same, and C a conduit which forms part of my invention and has for its purpose to convey water from the ditch through the bank to the land to be irrigated. The said conduit is made of iron, terra-cotta, or other suitable material and has one end upturned and arranged in the ditch, as shown in Fig. 1. This upturned end $a$ is provided with a lateral and upwardly-extending flange $b$, which forms a seat for a valve or gate proper, D, presently to be described.

E designates a framework, which may be of any suitable material and may be secured in position in any suitable manner without departing from the scope of my invention. I prefer, however, to employ the framework shown, which is constructed of wood and comprises two uprights $c$, disposed at either side of the conduit C and having their lower ends sunk in the ground, the lower cross-piece $d$, the upper cross-piece $e$, the horizontal bars $f$, connected to the uprights and provided with stakes $g$, which are sunk in the ground, and the platform $h$, which is arranged on and secured to the bars $f$. A guard-piece $i$ may also be provided, when necessary, to remove the liability of an operator stepping off the platform into the water.

The valve or gate proper, D, is hinged between the uprights $c$ of the framework and is provided with a loosely-connected stem F of wood, in which a longitudinal slot $j$ is formed for the passage of a bolt which has for its purpose to connect the stem to the cross-piece $e$ of the frame. The said bolt, which is lettered G, is provided at one end with a head $k$ and a washer $l$ and has its opposite end threaded, as shown, for the reception of a nut $m$. This nut is designed to be engaged and held against turning by a hasp H, which is loosely connected to the cross-piece $e$ and is provided with an angular opening $n$ to receive the nut and a slot $p$ to receive a hasp $q$. The hasp in turn is designed to be secured in position by a lock $r$, as shown in Fig. 1.

With the parts in the position shown in Fig. 1 the stem F is bound or clamped against the frame-bar $e$, and in consequence the valve or gate proper, D, is held securely to its seat and water is effectually prevented from passing into the conduit C. When it is desired to permit the passage of water from the ditch into and through conduit C, the lock $r$ is removed, the hasp H is swung out of engagement with the nut $m$, and the said nut is turned to relieve the pressure of the bolt-head against the valve-stem F. This being done, the stem F and the valve D may be raised to the extent desired, the bar $e$ being beveled, as indicated by $s$, to enable the stem to move freely with the valve. After the valve is opened to the extent desired it may be secured in such position by turning up the nut $m$, so as to clamp the valve-stem against bar $e$, replacing the hasp H, and securing it in position by the lock $r$. From this it will be appreciated that my improved head-gate is well adapted for use in those irrigation districts in which water is very scarce and in which it is sold by the owners of canals or ditches to the owners of contiguous lands at so much per cubic foot. When so used, the valve D may be nicely adjusted and secured in position, so as to permit the passage of a certain quantity of water through the conduit C within a given time. It will also be noticed that when the valve is once locked in position to gage the head of water passing through the conduit C its position cannot be changed by an unauthorized person.

By reason of the construction shown and described the valve is adapted to rise easy and close of itself and is not liable to leak, because the pressure of the valve against its seat is commensurate with the quantity of water in the ditch. The valve also entirely covers the open end of the conduit C, and thereby prevents washing out of the headgate and the great loss of water incident thereto.

In Figs. 5 and 6 I have illustrated a modified construction which is similar to that shown in Figs. 1 to 4 with the exception of the valve-stem, the upper cross-piece of the main frame, and the clamping-bolt. The valve-stem F' is simply a metallic rod which extends through an opening $s'$ in the cross-piece $e'$ and is provided at its upper end with a suitable handle $e^2$ to facilitate opening of the valve. The said valve-stem F' also passes through an eye $k'$, formed on the clamping-bolt G', whereby it will be seen that when the nut $m$ on said bolt is turned up the valve-stem will be clamped against the cross-piece $e'$, and when said nut is loosened the valve-stem will be rendered loose and free to move.

In both embodiments of my invention it will be seen that the bolt and the nut thereon form a clamp for securing the valve-stem and the valve in their adjusted positions.

Having thus described my invention, what I claim is—

1. In a head-gate, the combination of a main frame, a clamp, a suitable means for locking the clamp, a valve-seat, a valve, and a stem connected with the valve and engaged by and adjustable with respect to the clamp, substantially as specified.

2. In a head-gate, the combination of a main frame, a clamp comprising a bolt and a nut thereon, a hasp connected to the main frame and adapted to take over a staple thereon and arranged to engage the nut, a valve-seat, a valve, and a stem connected with the valve and engaged by and adjustable with respect to the bolt of the clamp, substantially as specified.

3. In a head-gate, the combination of a main frame, a conduit having an upturned end terminating in a valve-seat, a downwardly-seating valve connected in a hinged manner with the main frame, a clamp, a suitable means for locking the clamp, and a stem connected with the valve and engaged by and adjustable with respect to the clamp, substantially as specified.

4. In a head-gate, the combination of a main frame, a conduit having an upturned end terminating in an outwardly and upwardly extending flange forming a valve-seat, a downwardly-seating valve connected in a hinged manner with the main frame, a valve-stem connected to the valve, and a suitable means for adjustably fixing said stem with respect to the main frame, substantially as specified.

5. In a head-gate, the combination of a conduit having an upturned end terminating in a valve-seat, a main frame comprising uprights, horizontal bars connected to the uprights and having stakes sunk in the ground, a platform arranged on said horizontal bars, and a cross-piece connected to the uprights, a valve connected in a hinged manner to the main frame, a clamp arranged on the cross-piece of the main frame, and a stem connected with the valve and engaged by and adjustable with respect to the clamp, substantially as specified.

In testimony whereof I have hereunto set my hand in presence of two subscribing witnesses.

WILBER R. THORNTON.

Witnesses:
T. C. BUNYAN,
CHAS. M. TILTON.